United States Patent

Van Der Laan et al.

[11] Patent Number: 6,159,078
[45] Date of Patent: Dec. 12, 2000

[54] METHOD AND DEVICE FOR SHAPING A ROTATIONALLY-SYMMETRICAL SURFACE

[75] Inventors: Cornelis Jacobus Van Der Laan, Maassluis; Oliver Fähnle, Delft; Jakobus Johannes Korpershoek, Schiedam, all of Netherlands

[73] Assignee: Nederlandse Organisatie Voor Toegepast-Natuurwetenschappelijk Onderzoek TNO, Delft, Netherlands

[21] Appl. No.: 09/051,436

[22] PCT Filed: Aug. 29, 1996

[86] PCT No.: PCT/NL96/00343

§ 371 Date: Apr. 13, 1998

§ 102(e) Date: Apr. 13, 1998

[87] PCT Pub. No.: WO97/13615

PCT Pub. Date: Apr. 17, 1997

[30] Foreign Application Priority Data

Oct. 13, 1995 [NL] Netherlands ............................ 1001418

[51] Int. Cl.⁷ .................................................. B24B 1/00
[52] U.S. Cl. .............................. 451/41; 451/42; 451/296; 451/307
[58] Field of Search ............................ 451/41, 296, 307, 451/42, 310

[56] References Cited

U.S. PATENT DOCUMENTS

| | | | |
|---|---|---|---|
| 4,606,151 | 8/1986 | Heynacher | 451/168 |
| 4,656,787 | 4/1987 | Ueda et al. | 451/143 |
| 4,850,152 | 7/1989 | Heynacher et al. | 451/168 |
| 5,347,763 | 9/1994 | Miyamoto et al. | 451/241 |
| 5,577,950 | 11/1996 | Smith et al. | 451/384 |
| 5,653,626 | 8/1997 | Gottschald et al. | 451/390 |
| 5,695,393 | 12/1997 | Granziera | 451/390 |

FOREIGN PATENT DOCUMENTS

| | | |
|---|---|---|
| 0 247 210 | 12/1987 | European Pat. Off. . |
| 17 29 096 B | 5/1972 | Germany . |

OTHER PUBLICATIONS

A.W. Davis, "The application of Mathematics in Industry", 1982, Martinus Nijhoff, The Hague, Boston, London, pp. 159–164.

Primary Examiner—M. Rachuba
Attorney, Agent, or Firm—Heller Ehrman White & McAuliffe, LLP

[57] ABSTRACT

An apparatus and a method for shaping a rotationally-symmetrical surface in a material, where the material is rotated about an axis and a rotating element is placed in contact with the rotating material. The rotating element is provided with a symmetrical, coherent shaping edge, or is provided with such an edge at one end, or as an alternative, is a shaping head which travels around a symmetrical, coherent contour. The axis of rotation of the rotating element is then placed at an angle to the axis of rotation of the material and, during shaping, a force is exerted on the rotating element such that the shaping edge or the shaping head is held in contact with the material and such that the lateral position of the shaping edge or the contour around which the rotating element travels in operation remains approximately constant with respect to the material. The shaping edge/contour has an acircular shape and the orientation thereof is kept approximately constant with respect to the material during shaping. The shape of the shaping edge/contour and the angle between the axis of rotation are matched to the desired ashperical shape of the curves of the material.

12 Claims, 5 Drawing Sheets

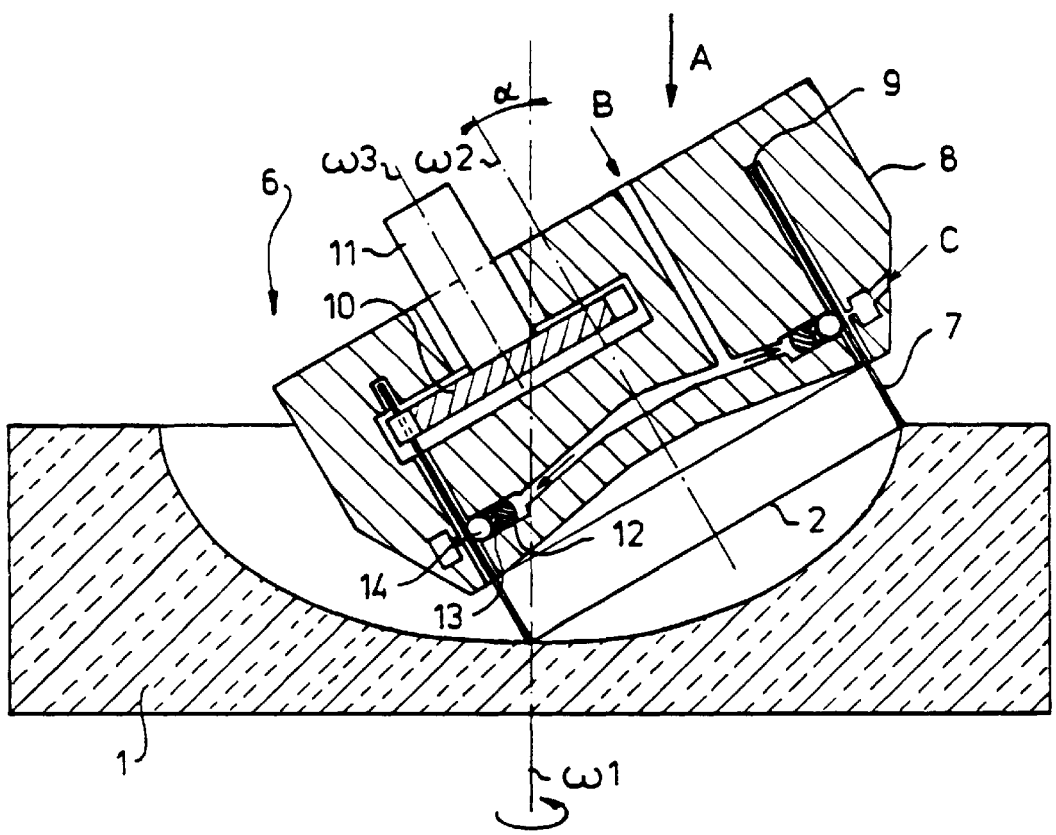

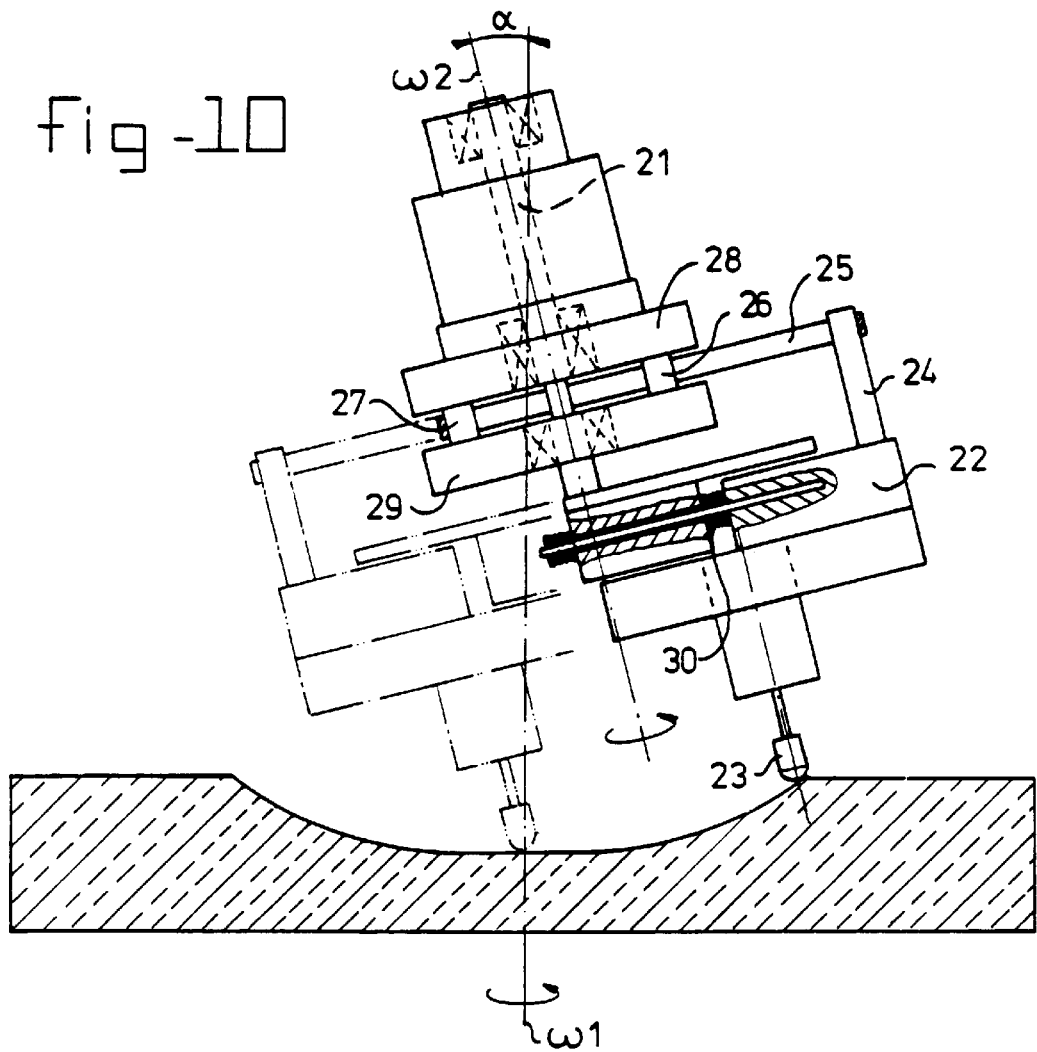
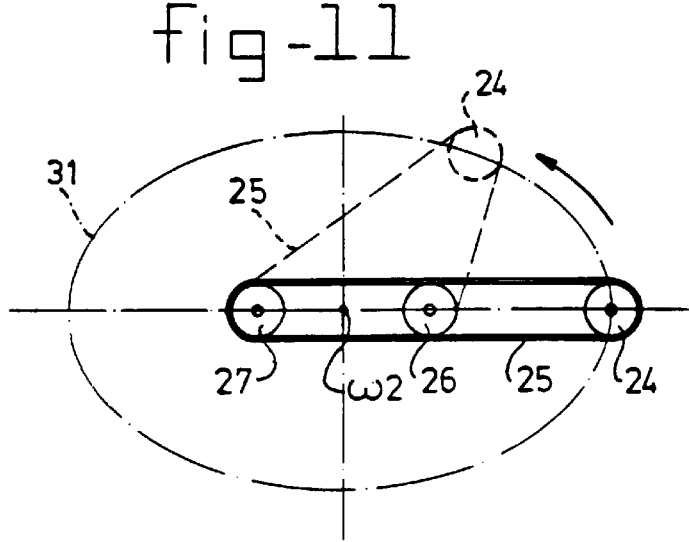

METHOD AND DEVICE FOR SHAPING A ROTATIONALLY-SYMMETRICAL SURFACE

The present invention relates to a method for shaping a rotationally-symmetrical surface in a material. A method of this type is known in practice wherein the material is rotated about an axis;

a tubular rotary element, which has a symmetrical, coherent shaping edge at least at one end is placed in contact with the rotating material, the axis of rotation of the rotating element is placed at an angle to the axis of rotation of the material, and during shaping a force is exerted on the rotating element such that the shaping edge is held in contact with the material and the lateral position of the shaping edge with respect to the material remains approximately constant. In the case of the known method spherical surfaces are ground in optical material, such as glass or ceramic material, with the aid of a rotating hollow tube which has a circular shaped edge at one end thereof.

The known method has the disadvantage that it is not possible to shape aspherical surfaces using this method. However, components with aspherical surfaces are being used to an increasing extent, mainly in complex optical systems, in which one aspherical component can often serve to replace one or more spherical components.

Aspherical surfaces are currently produced by manual or computer-controlled local grinding down or polishing of the surface of an existing spherical component until the desired aspherical surface has been obtained. This is an iterative process in which the shape of the surface must regularly be measured and compared with the desired shape. The major disadvantages of manual grinding down are that it is time-consuming and that the accuracy is highly dependent on the experience and skill of the operator. Computer-controlled grinding-down has the disadvantage that it requires a computer with appreciable computing capacity.

The aim of the present invention is to provide a method of the type mentioned in the preamble which makes it possible to shape a rotationally-symmetrical aspherical surface in a material in an autonomous manner.

To this end the method according to the invention comprising the steps of:

rotating the material about an axis, moving a shaping element along a closed acircular contour in a plane, placing the shaping element in contact with the rotating material, placing the plane of the contour at an angle to the axis of rotation of the material, moving the plane of the contour in the direction of the axis of rotation of the material while maintaining a substantially constant distance between the contour and the axis of rotation of the workpiece and a substantially constant angle, $\alpha$, between the direction perpendicular to the plane of the contour and the axis of rotation of the workpiece.

In this regard the method according to the invention has the advantage that it is a self-correcting process. The method is, moreover, outstandingly suitable as a production process because of its autonomous character.

The present invention also relates to a device for shaping a rotationally-symmetrical surface in a material, comprising a mount for rotating material to be shaped around an axis of rotation, a shaping element movable along a closed acircular contour in a plane, drive means for moving the shaping element along the contour, and a displacement member for displacing the shaping element in the direction of the axis of rotation.

In an advantageous embodiment of the device according to the invention, the rotatable element is a rotatable endless grinding belt.

In a further advantageous preferred embodiment of the device according to the invention the grinding belt is placed rotatably with respect to a guide element, wherein the shape of the periphery of the guide element essentially corresponds to the shape of the shaping edge of the grinding belt, wherein at least part of the grinding belt runs over the circumference of the guide element. This device has an elegant, simple construction and can be manufactured at relatively low cost.

Another embodiment of a device according to the present invention comprises a grinding head or a polishing head. Preferably the drive means comprise a belt of flexible material which is kept taut by at least two pins, wherein the shaping element is movable over the inside of said belt, preferably via a transmission means attached to the shaping element. In this way the grinding head is moved along an elliptical contour.

The present invention also relates to an assembly of the shaping element and drive means as an auxiliary device with which an existing milling machine can be equipped such that it meets all the requirements of the device of the present invention. In this way the device according to the invention can thus be realised at low cost.

The invention will be explained in more detail with reference to the appending drawings, in which.

FIGS. 3a, 3b to 7a, 7b respectively show a number of possible shapes of the shaping edge/the acircular contour and the surface shapes of the material which can be obtained with these.

Figure 8:
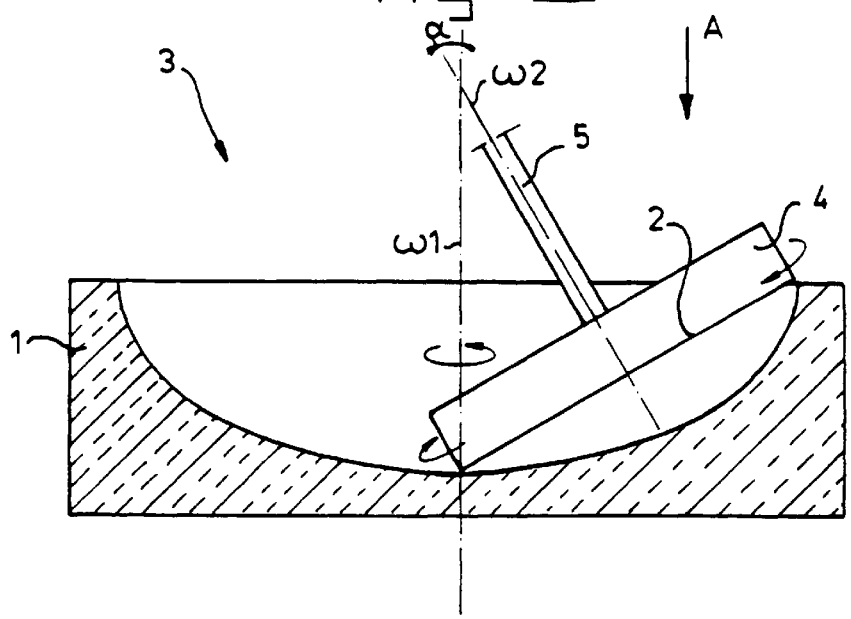

FIG. 8 shows a partial side cross-sectional view of a first preferred embodiment of a first device according to the invention, and FIG. 9 shows a cross-sectional view of a second preferred embodiment of the first device according to the invention.

FIG. 10 shows a cross-sectional view of a preferred embodiment of the second alternative device according to the invention.

FIG. 11 is a diagrammatic illustration of the functioning of the second device according to FIG. 10.

Figure 1:
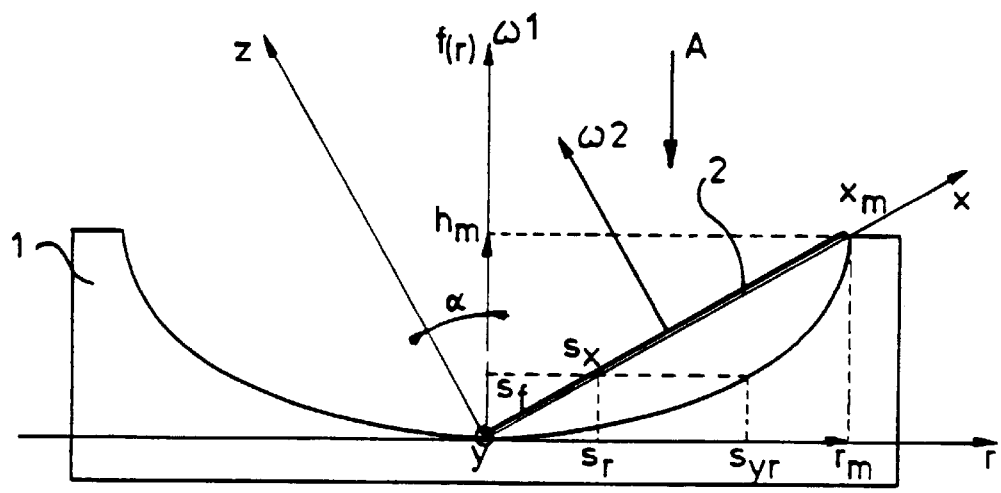
FIG. 1 shows, diagrammatically, the functioning of a first method according to the invention.

FIG. 1 shows, diagrammatically, the functioning of the first method according to the invention. The workpiece 1 is an optical material, in this example glass, which can be rotated about an axis of rotation $\omega_1$. A desired rotationally-symmetrical shape can be produced in the surface of material 1 with the aid of a rotatable element (not shown) which is provided with a shaping edge 2. To this end shaping edge 2 can be rotated about axis of rotation $\omega_2$.

A system of coordinates y, r, f is defined for the material 1. A system of coordinates y, x, z is defined for shaping edge 2. To shape a rotationally-symmetrical surface in material 1, shaping edge 2 is, in this example, now positioned such that the origins of the respective systems of coordinates are coincident, as is shown in FIG. 1. With this arrangement the z axis makes an angle $\alpha$ with the f axis. Said angle $\alpha$ and the shape of shaping edge 2 now define the shape which the surface of material 1 will acquire. In the text which follows this shape will be represented by the function f(r), which represents the cross-section of the shape of the surface of material 1 in the r, f plane. The shape of shaping edge 2, or the shape of the cross-section thereof in the x, y plane, will be represented by coordinates x and y.

During the shaping process, a force is exerted on shaping edge 2 such that at least part of the shaping edge is held in contact with the material 1 and the lateral position of the shaping edge 2 with respect to material 1 remains approximately constant. The direction of movement of shaping edge 2 is approximately parallel to the f axis (see arrow A). Only if the above conditions are met does shaping edge 2 come into contact with every point of material 1 during the shaping process and there can be said to be a line-contact method. This is achieved in that both shaping edge 2 and material 1 rotate. In order to obtain a rotationally-symmetrical aspherical surface it is also important that the orientation of shaping edge 2 with respect to material 1 as far as possible remains constant during the shaping process.

Figure 2:
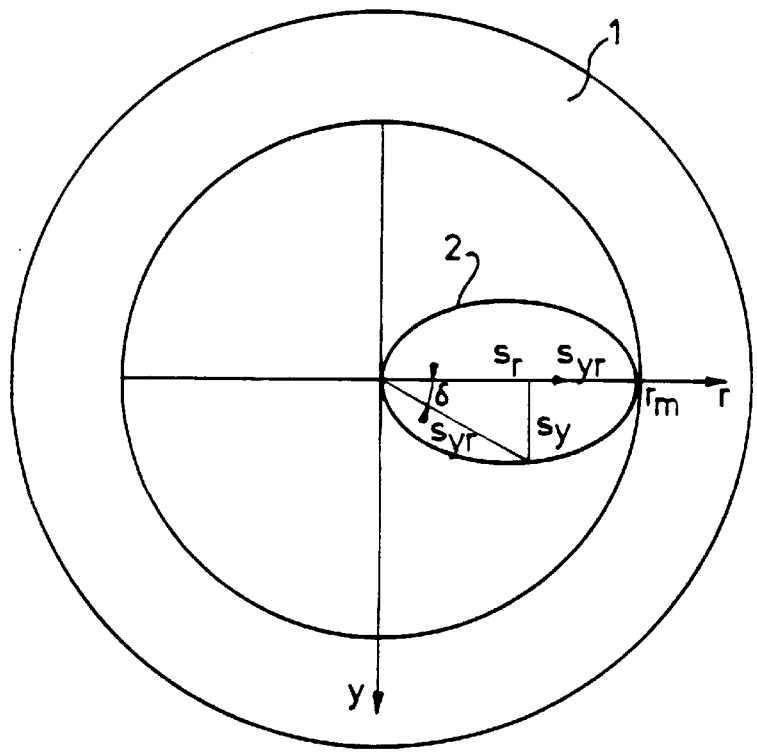
FIG. 2 shows a top view of the diagrammatic representation in FIG. 1.
Figure 3:
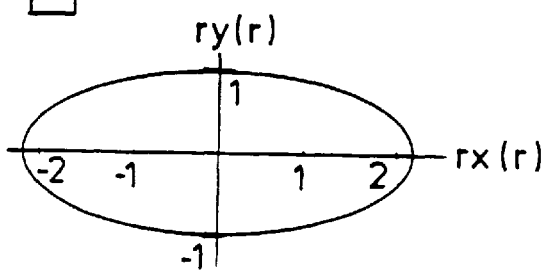
Figure 3:
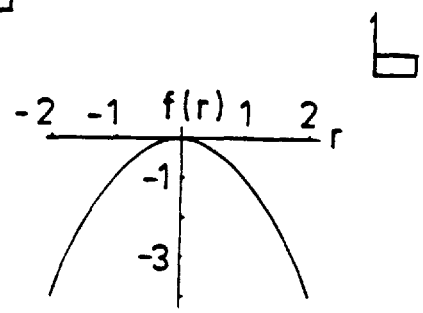
Figure 4:
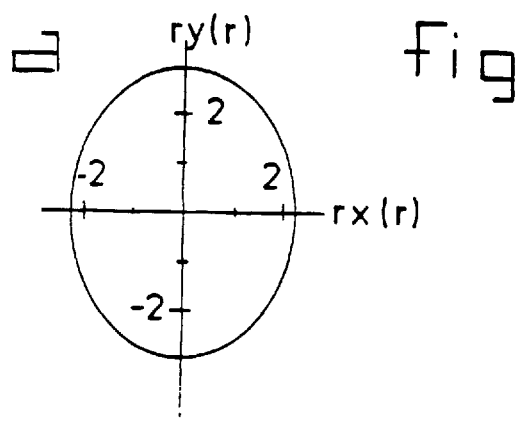
Figure 4:
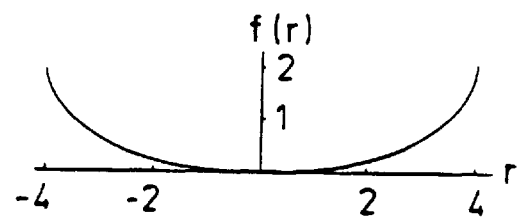
Figure 5:
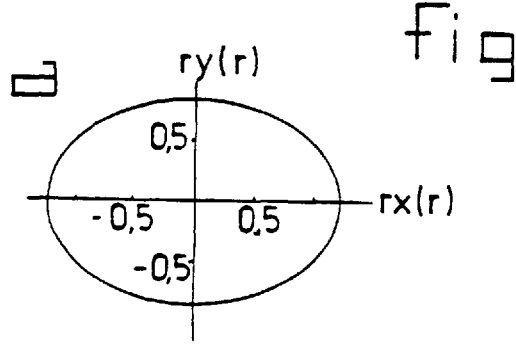
Figure 5:
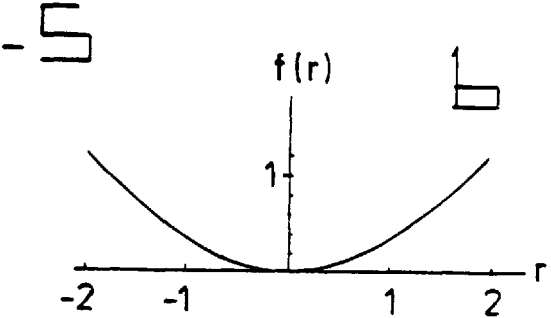
Figure 6:
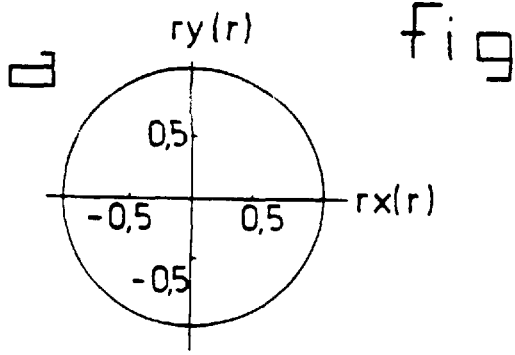
Figure 6:
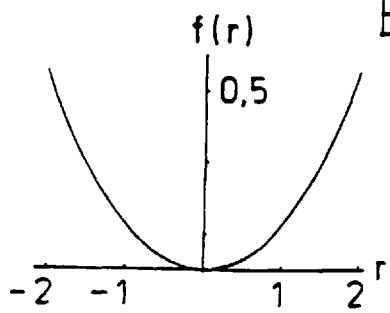

FIG. 2 shows a top view of the diagrammatic representation in FIG. 1. It can clearly be seen that shaping edge 2 has an elliptical shape here.

In order to shape so-called "on-axis surfaces" with the aid of the first method according to the present invention it is also important that the origin of the systems of coordinates of, respectively, material 1 and shaping edge 2 are as far as possible coincident. This is achieved by meeting the condition that the shaping edge 2 lies approximately in one point thereof on the axis of rotation $\omega_1$ of the material. This can be clearly seen in FIG. 2. This condition is of no importance for shaping off-axis surfaces, as will be explained below.

As is indicated in FIGS. 1 and 2, a point S, which is localised on the shaping edge 2, generates a surface height $s_f = f(s_{yr}) = f(r)$ at a distance of $s_{yr} = r$ from the centre of rotation of the material 1. The point S can be defined by the vector s in the system of coordinates of the shaping edge 2 as $$s = \begin{pmatrix} s_x \\ s_y \\ 0 \end{pmatrix} \quad (1)$$

The calculations of the required shape of shaping edge 2 are based on the following equations which can be derived directly from FIGS. 1 and 2.

$$\tan(\alpha) = \frac{h_m}{r_m} = \frac{s_f}{s_r} = \frac{f(s_{yr})}{s_r} = \frac{f(r)}{s_r} \quad (2)$$

$$s_{yr}^2 = s_r^2 + s_y^2 \quad (3)$$

$$x^2 = s_x^2 = s_r^2 + f^2(r) \quad (4)$$

It can be seen from FIG. 1 that the following applies:

$$s_{yr} = r \quad (5)$$

$$s_f = f(r) \quad (6)$$

$$r^2 = \left(\frac{r_m}{h_m} f(r)\right)^2 + s_y^2 \quad (7)$$

-continued $$s_y = \sqrt{r^2 - \left(\frac{r_m}{h_m}\right)^2 f^2(r)} \quad (8)$$

Equations 9 and 10, which define the shape of shaping edge 2 as a function of the shape of the cross-section of the desired surface of material 1 in the f, r plane, are obtained by combination of the above equations.

$$x = s_x = f(r) \sqrt{1 + \left(\frac{1}{\tan\alpha}\right)^2} \quad (9)$$

$$y = s_y = \sqrt{r^2 - \left(\frac{1}{\tan\alpha}\right)^2 f^2(r)} \quad (10)$$

Equations 9 and 10, which define the shape of shaping edge 2 as a function of the shape of the cross-section of the desired surface of material 1 in the f, r plane, are obtained by combination of the above equations.

By varying the angle α and the coordinates x and y of the shaping edge it is now possible to shape all sorts of rotationally-symmetrical surfaces in material 1.

FIGS. 3a and 3b respectively to 7a and 7b respectively show, by way of illustration, a number of possible shapes for the shaping edge 2 and the associated surface shapes of material 1 which can be obtained with these. In the said figures, the figures designated by a always show the chosen cross-section of shaping edge 2 and the figures indicated by b show the radial cross-section of the surface of material 1 which is obtained.

It can be seen from FIGS. 3a and 3b that the choice of an elliptical shaping edge can lead, depending on the orientation thereof, to a surface with a paraboloid cross-section.

FIG. 4a illustrates that the choice of an elliptical shaping edge can, with a different orientation thereof, lead to an elliptical cross-section of the surface of material 1, shown in FIG. 4b.

FIG. 5a shows yet a further orientation of shaping edge 2 with an elliptical cross-section thereof which leads to a surface with a hyperboloid cross-section shown in FIG. 5b.

FIGS. 3a to 5b show examples for the shaping of rotationally-symmetrical aspherical surfaces.

Figure 7A:
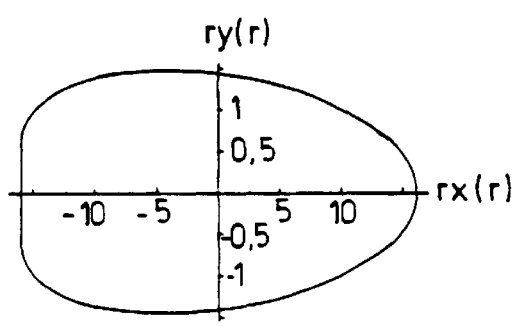
Figure 7B:
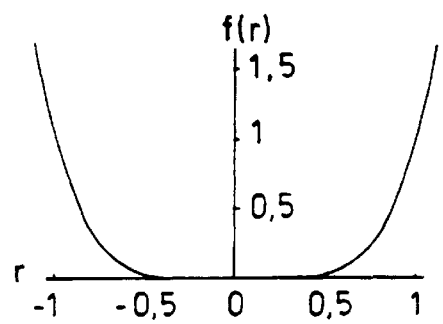

In general, the use of a shaping edge which has a cross-section which is symmetrical with respect to one axis (instead of with respect to two axes as in the case of the shapes previously shown) leads to a surface which has a cross-section which can be described by a higher order polynomial function. This is illustrated in FIGS. 7a and 7b. The resultant radial cross-section of the surface shown in FIG. 7b satisfies a fifth order polynomial function.

The products produced using the described method according to the invention have a surface which meets two important requirements, i.e.:

1) a high degree of smoothness
2) a high degree of dimensional accuracy.

In general, the following three stages can be differentiated in the shaping process:

a) coarse grinding, with which 80 nm root mean square (RMS) roughness and 800 nm peak value (PV) dimensional accuracy can be obtained, b) ductile grinding, with which <5 nm RMS roughness and <140 PV dimensional accuracy can be obtained, c) polishing, for example fresh-feed polishing followed by bowl-feed polishing, with which <0.5 nm RMS roughness and <30 nm PV dimensional accuracy can be obtained. Here RMS denotes the average square value of all deviations in the surface obtained and PV is the maximum deviation in the surface.

The method also has the advantage that both coarse grinding and grinding down of the surface can be carried out using the same associated device.

During the abovementioned stages, the shaping process can be interrupted to determine whether the desired accuracy has been obtained. However, the method according to the invention is not an iterative process but an autonomous process and is therefore outstandingly suitable for mass production.

This is even more true because of the fact that it is possible by varying the angle α to generate different surface shapes using one and the same shape of shaping edge. In other words: many types of surfaces can be shaped using one template.

The method according to the invention is, furthermore, a self-correcting process; any errors which occur in the surface of the material during shaping are corrected autonomously. This is achieved by a combination of the following effects:

a) wear of the shaping edge,
b) the method is a line-contact method, with which every point on the shaping edge comes into contact with the entire surface of the material,
c) the removal of material is produced by the essentially vertical loading of the shaping edge and by the two rotary movements of the material and the shaping edge,
d) the angle α between the shaping edge and the material is kept constant during the production.

It can also be pointed out that there can be said to be at least three degrees of freedom with the method according to the invention in operation:

1) rotation of the material
2) rotation of the shaping edge
3) translation of the shaping edge in the f direction The combination of these freedoms of movement contributes to the self-correcting character of the present method.

FIG. 8 shows a first preferred embodiment of a device for carrying out the first method according to the invention. Device 3 is provided with a rotatable element 4, which has a symmetrical, coherent shaping edge 2 at least at one end. During shaping, rotatable element 4 is positioned with respect to the rotatably mounted material 1 such that the shaping edge 2 essentially lies with one point thereof on the axis of rotation $\omega_1$ of material 1. With this arrangement the axis of rotation $\omega_2$ of the rotatable element 4 is positioned at an angle α to the axis of rotation $\omega_1$ of the material 1. The element 4 and the material 1 are rotated during shaping, a force being exerted on the rotating element 4 such that the shaping edge 2 is held in contact with the material 1 and the lateral position of the shaping edge 2 with respect to the material 1 remains approximately constant. With this arrangement the direction of movement of shaping edge 2 is approximately parallel to the f axis (see arrow A). Shaping edge 2 has an acircular shape, the orientation of which with respect to the material 1 remains approximately constant during the shaping process. The shape of the shaping edge 2 and the angle α are matched in advance to a desired aspherical shape of the surface of the material 1. In FIG. 8 the rotatable element consists of an endless grinding belt 4, which is rotatable over a guide element 5.

FIG. 9 shows a second preferred embodiment of a device for carrying out the method according to the invention. Device 6 is provided with a rotatable element 7, for example a grinding belt. Grinding belt 7 has a symmetrical, coherent shaping edge 2 at least at one end. The position of shaping edge 2 with respect to material 1 is analogous to what has been described above, inter alia with respect to FIG. 8. In the preferred embodiment shown, grinding belt 7 is accommodated in recess 9 of guide element 8. In this embodiment recess 9 is of shape such that grinding belt 7 is able to rotate freely therein. To this end, grinding belt 7 is driven with the aid of a gear wheel 10, the associated axis of rotation 11 of which is able to rotate about $\omega_3$. To ensure that grinding belt 7 can continue to rotate freely in recess 9 of guide element 8, use if preferably made of a combination of an air suspension and a mechanical suspension in device 6. As is known, a mechanical suspension can be produced in many ways. In device 6, the mechanical suspension preferably comprises an O ring 12 and a ball bearing 14 with a guide 13 between them. Ball bearing 14 can, for example, consist of balls or of a multiplicity of cylinders which are able to rotate about an axis which runs parallel to the axis of rotation $\omega_2$ of the grinding belt 7. Guide 13 is a stationary guide to minimise the friction between ball bearings 14 (preferably made of metal) and O ring 12 (preferably made of rubber). Guide 13 is preferably a metal spring. Arrows B and C indicate the direction in which compressed air is fed into guide element 8. When driving grinding belt 7, this compressed air, in combination with the mechanical suspension system, ensures that grinding belt 7 is freely rotatable inside recess 9. The position of grinding belt 7 can be determined with high accuracy with the aid of the construction described. It can also be pointed out that, in addition to the gear wheel drive described, many other types of drive are suitable for use with the device described. It will also be clear to a person skilled in the art that the type of guide element 8 in device 6 is not relevant.

In another preferred device (not shown) the grinding belt is positioned rotatably with respect to a tubular guide element. With this arrangement, the shape of the peripheral edge of the tubular element essentially corresponds to the shape of the shaping edge of the grinding belt, at least part of the grinding belt running over the circumference of the guide element. This device has an elegant construction, in which a preferably tubular element serves as guide element for the grinding belt, and is, moreover, simple to manufacture. The device preferably makes use of hydrostatic pressure for guiding the grinding belt. To promote the positional accuracy, use is preferably made of a device with air suspension. Devices with other types of suspension, such as devices with magnetic suspensions, can also be suitable.

Although the shape of the ground surface is determined by the shape of the cross-section of the grinding belt (that is to say the shape of the shaping edge) it is not necessary to produce a shape of the shaping edge with the same accuracy as is required for the surface to be ground. This is because of the fact that inaccuracies along the shaping edge of the grinding belt generate errors at surface level which are reduced by an accuracy propagation factor. Said accuracy propagation factor is dependent on the angle α. The smaller the chosen angle α, the smaller will be the extent to which errors in the shape of the shaping edge are translated to the surface to be ground. It can therefore be advantageous to take account of this when designing a device according to the invention. Furthermore, it is possible to calculate and/or to measure certain deviations in advance and to compensate for the consequences of these in the design of the shaping edge. Examples of such deviations are:

inaccuracies in the control of the grinding belt: that is to say the actual shape followed by the shaping edge deviates from the ideal shape calculated in advance;

small inaccuracies in the positioning of the guide element with respect to the material.

The present invention also relates to a second method and an associated device which serve as an alternative for the method and device described above. The alternative method has the same objective as the method described above: namely to provide a possibility for shaping a rotationally-symmetrical aspherical surface in a material in an autonomous manner. The alternative method also has substantially the same technical measures as the method described first. The most significant difference lies in the fact that with the alternative method use is made of a shaping head which travels around a symmetrical, coherent, acircular contour. This constitutes an alternative to the use of the symmetrical, coherent, acircular shaping edge in the method mentioned first. It is pointed out that the above description to illustrate the first method is fully applicable to the alternative method if the person skilled in the art bears this difference in mind and, where necessary, replaces the term "shaping edge" by "contour".

The alternative method according to the invention is likewise self-correcting, this being achieved by a combination of effects a to d as described on page 8 of the present application. However, it will be clear to a person skilled in the art that the alternative method is a point-contact method instead of a line-contact method. The advantage which can be obtained with the alternative method will be clear from the description of the alternative device.

FIG. 10 shows the alternative device 20 according to the invention. Device 20 is provided with a rotary shaft 21 to which a plate-shaped body 22 is attached. A shaping head 23 is fixed, preferably rigidly, to the plate-shaped body 22. Device 20 is also provided with a number of pins 24, 26 and 27, which are positioned inside a belt 25 of flexible material. Preferably at least the positions of pins 26 and 27 are adjustable, for example with the aid of further plate-shaped bodies 28 and 29. Pin 24 is pressed against the inside of belt 25 with the aid of pretensioning means 30.

The functioning of device 20 can be better understood with reference to FIG. 11, in which the movement of pin 24 within belt 25 is shown diagrammatically. In this figure pin 24 is drawn in two positions, which makes it clear that pin 24 travels around ellipse 31. The shape of ellipse 31 is determined by the spacing of pins 26 and 27 and the length of the belt 25.

As shaping head 23 is rigidly connected via transmission means, in this example in the form of plate-shaped body 22, to pin 24, shaping head 23 will travel round an acircular contour which can be calculated in advance. If instead of plate-shaped body 22 a pantograph is used, the acircular contour, passed through by the shaping head 23. will also be an ellipse.

A great advantage of device 20 is that once the pins and the length of the belt have been adjusted the shaping process can proceed autonomously.

It will be clear that the number of pins (two in this example: i.e. 26 and 27) can be two or more, depending on the desired contour around which pin 24 has to travel or the desired aspherical shape which shaping head 23 has to grind in material 1.

Shaping head 23 is preferably a polishing head or grinding head known per se. For example a spherical head dressed with powdered diamond is suitable. However, it will be clear that all suitable materials known in the art can be used for the shaping head. Preferably shaping head 23 is mounted such that its height is adjustable.

Analogously to the first method, it is possible to calculate and/or to measure certain deviations in advance and to compensate for the consequences of these in the design of the acircular contour around which shaping head 23 travels with a specific setting of pins 26, 27 and belt 25.

It will also be clear that the ultimate aspherical shape of the surface of material 1 is determined by the angle $\alpha$ between the axis of rotation $\omega_1$ of material 1 and the axis of rotation $\omega_2$ of device 20 and by the acircular contour around which shaping head 23 travels in operation. For calculation of the aspherical shape, use can be made of the equations described above, where x and y are the coordinates of the acircular contour around which shaping head 23 travels.

It will be clear to a person skilled in the art that the methods and devices according to the invention can also be employed for the production of off-axis surfaces by a lateral shift $\gamma$ of the shaping edge or the contour parallel to the r axis (not shown). In this case an off-axis surface is produced in the range $\gamma \leq r \leq r_m$ and equations 9 and 10 must be replaced by equations 9a and 10a:

$$x(r) = \frac{f(r) - f(\gamma)}{\sin \alpha} \tag{9a}$$

$$y(r) = \sqrt{r^2 - \left(\frac{f(r)}{\tan \alpha} + \frac{\gamma f(r_m) - r_m f(\gamma)}{f(r_m) - f(\gamma)}\right)^2} \tag{10a}$$

It is also pointed out that it is important that shaping head 23 travels around a symmetrical, coherent acircular contour which lies approximately in one plane. In the case of the method mentioned first, this condition is automatically met since use is made of a shaping edge.

The advantage of device 20 is that said device can be implemented in the form of an auxiliary device, consisting of the guide means, such as pins 24, 26 and 27, belt 25 and, if appropriate, transmission means 22 and shaping head 23, on an existing milling machine. Such an existing milling machine can, for example, be a computer-controlled polishing or grinding machine, but can also comprise all milling machines known in the art. This means that the device according to the invention can be realised at relatively low cost.

Although the present invention has been explained with reference to the shaping of a glass-like material, it will be immediately clear to a person skilled in the art that the invention is not restricted to this. The methods and devices according to the invention are outstandingly suitable for shaping surfaces in optical materials. Examples of such materials are glass and ceramic materials. The methods and devices described can also be used for grinding other materials, such as metal. It will also be clear that the methods and devices in question are suitable for shaping both convex and concave surfaces.

We claim:

1. A method for shaping a rotationally-symmetrical aspherical surface in a material comprising the steps of:

(a) rotating the material about an axis, (b) moving a shaping element along a closed symmetrical acircular contour in a plane, the shaping element defining a shaping edge along the contour or comprising a shaping head which is moved along the contour, where an axis of symmetry of the contour intersects the axis of rotation of the material, (c) placing the shaping element in contact with the rotating material, (d) moving the plane of the contour in the direction of the axis of rotation of the material while maintaining a substantially constant distance between the contour and the axis of rotation of the material and a substantially constant angle, α, between the direction perpendicular to the plane of the contour and the axis of rotation of the material.

2. The method of claim 1 where the shaping element defines a shaping edge along the contour.

3. The method of claim 1 where the shaping element comprises a shaping head which is moved along the contour.

4. The method of any one of claims 1 to 3 where the rotationally-symmetrical aspherical surface has a desired cross-sectional shape defined by f(r) where r is the radial distance from the axis of rotation of the material, and the contour has x and y coordinates in the plane of the contour defined by the equations:

$$x = s_x = f(r)\sqrt{1 + \left(\frac{1}{\tan\alpha}\right)^2} \; ; \; y = s_y = \sqrt{r^2 - \left(\frac{1}{\tan\alpha}\right)^2 f^2(r)}.$$

5. A device for shaping a rotationally-symmetrical aspherical surface in a material, comprising:
   (a) a mount for rotating the material to be shaped around an axis of rotation,
   (b) a shaping element movable along a closed symmetrical acircular contour in a plane, the shaping element defining a shaping edge along the contour or comprising a shaping head which is moved along the contour, an axis of symmetry of the contour intersecting the axis of rotation of the material,
   (c) drive means for moving the shaping element along the contour, and
   (d) a displacement member for displacing the shaping element in the direction of the axis of rotation of the material while maintaining a substantially constant distance between the contour and the axis of rotation of the material and a substantially constant angle, α, between the direction perpendicular to the plane of the contour and the axis of rotation of the material.

6. The device of claim 5 where the shaping element comprises an endless grinding belt extending along the contour.

7. The device of claim 6 where the drive means comprises a guide element having a circumference corresponding to the shape of the contour, the grinding belt running over the circumference of the guide element.

8. The device of claim 7 where the guide element comprises a recess in which the grinding belt is positioned.

9. The device of any one of claims 5 to 8 where the device comprises an air suspension.

10. The device of claim 5 where the shaping element comprises a grinding head or a polishing head.

11. The device of either of claims 5 or 10 where the drive means comprises a belt of flexible material which is kept taut by at least two pins and the shaping element is movable over the inside of said belt.

12. The device of claim 11 where the shaping element is movable by a transmission attached to the shaping element.

* * * * *